(12) United States Patent
van der Meulen

(10) Patent No.: US 7,599,712 B2
(45) Date of Patent: Oct. 6, 2009

(54) APPARATUS AND METHODS FOR PROVIDING DIRECTIONAL COMMANDS FOR A MOBILE COMPUTING DEVICE

(75) Inventor: Pieter S. van der Meulen, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 617 days.

(21) Appl. No.: 11/535,683

(22) Filed: Sep. 27, 2006

(65) Prior Publication Data
US 2008/0076487 A1 Mar. 27, 2008

(51) Int. Cl.
G06F 3/00 (2006.01)
G06F 13/12 (2006.01)
G06F 13/38 (2006.01)
G06F 3/02 (2006.01)
G09G 5/00 (2006.01)
A63F 9/24 (2006.01)
H04M 1/00 (2006.01)
H03M 11/00 (2006.01)
H03K 17/94 (2006.01)

(52) U.S. Cl. .................. 455/556.1; 345/168; 345/169; 345/172; 345/173; 455/566; 463/1; 463/36; 463/37; 710/8; 710/67; 341/22

(58) Field of Classification Search .............. 341/22; 345/168, 169, 172, 173; 455/575.1; 463/1, 463/36, 37; 710/8, 67; D14/338
See application file for complete search history.

(56) References Cited

U.S. PATENT DOCUMENTS

| | | | | |
|---|---|---|---|---|
| 6,011,554 A * | 1/2000 | King et al. | ................. | 715/811 |
| 7,134,094 B2 * | 11/2006 | Stabb et al. | ................. | 715/827 |
| 7,154,480 B2 * | 12/2006 | Iesaka | ........................ | 345/173 |
| 2004/0049743 A1 | 3/2004 | Bogward | | |
| 2005/0104867 A1 | 5/2005 | Westerman et al. | | |
| 2006/0176279 A1 * | 8/2006 | Bersenev et al. | ............ | 345/169 |
| 2006/0176283 A1 | 8/2006 | Suraqui et al. | | |
| 2006/0197753 A1 | 9/2006 | Hotelling | | |
| 2007/0273561 A1 * | 11/2007 | Philipp | ........................ | 341/33 |
| 2008/0122658 A1 * | 5/2008 | Salman et al. | ................. | 341/22 |

FOREIGN PATENT DOCUMENTS

WO 2008039844 A2 3/2008

* cited by examiner

Primary Examiner—Nick Corsaro
Assistant Examiner—Larry Sternbane
(74) Attorney, Agent, or Firm—Kacvinsky LLC

(57) ABSTRACT

Various embodiments for providing directional commands for a mobile computing device are described. In one or more embodiments, a mobile computing device may comprise a keypad arranged to operate in multiple modes including a standard mode and a directional mode such as a gaming mode, for example. The standard mode may support all of the preset and programmable commands and functions typically provided for normal operation of the mobile computing device. The directional mode may associate certain directional commands with multiple keys and/or buttons of the keypad so that most keystrokes and keystroke combinations input by a user will be interpreted as a particular directional command. The directional mode may be used when running applications which respond primarily to directional commands such as gaming applications. Other embodiments are described and claimed.

22 Claims, 3 Drawing Sheets

300

DETERMINE USER INPUT KEYSTROKES
AND KEYSTROKE COMBINATIONS
TO A KEYPAD REGION OF A KEPAD
302

INTERPRET KEYSTROKES AND KEYSTROKE
COMBINATIONS TO THE KEYPAD REGION
AS A DIRECTIONAL COMMAND
304

GENERATE KEYPAD DATA REPRESENTING
THE DIRECTIONAL COMMAND
306

FORWARD THE KEYPAD DATA TO AN
APPLICATION ARRANGED TO RECEIVE
DIRECTIONAL COMMANDS AS INPUT
308

FIG. 3

APPARATUS AND METHODS FOR PROVIDING DIRECTIONAL COMMANDS FOR A MOBILE COMPUTING DEVICE

BACKGROUND

A mobile computing device such as a combination handheld computer and mobile telephone or smart phone generally may provide voice and data communications functionality, as well as computing and processing capabilities. In addition, a mobile computing device may support various types of applications such as gaming applications which receive directional commands as input. Accordingly, there may be a need for an improved apparatus and methods for providing directional commands for a mobile computing device.

BRIEF DESCRIPTION OF THE DRAWINGS

FIG. 3 illustrates a logic flow in accordance with one or more embodiments.

DETAILED DESCRIPTION

Various embodiments are directed to providing directional commands for a mobile computing device. In one or more embodiments, a mobile computing device may comprise a keypad arranged to operate in multiple modes including a standard mode and a directional mode such as a gaming mode, for example. The standard mode may support all of the preset and programmable commands and functions typically provided for normal operation of the mobile computing device. The directional mode may associate certain directional commands (e.g., left and right commands) with multiple keys and/or buttons of the keypad so that most keystrokes and keystroke combinations input by a user will be interpreted as a particular directional command (e.g., left command or right command). The directional mode may be used when running applications which respond primarily to directional commands such as gaming applications.

In the directional mode, the keypad may comprise or implement multiple keypad regions each associated with a different directional command. Each keypad region may comprise several keys of the keypad and may be associated with a particular directional command. Accordingly, a user may press any key within a particular keypad region to generate the identical directional command.

Figure 1:
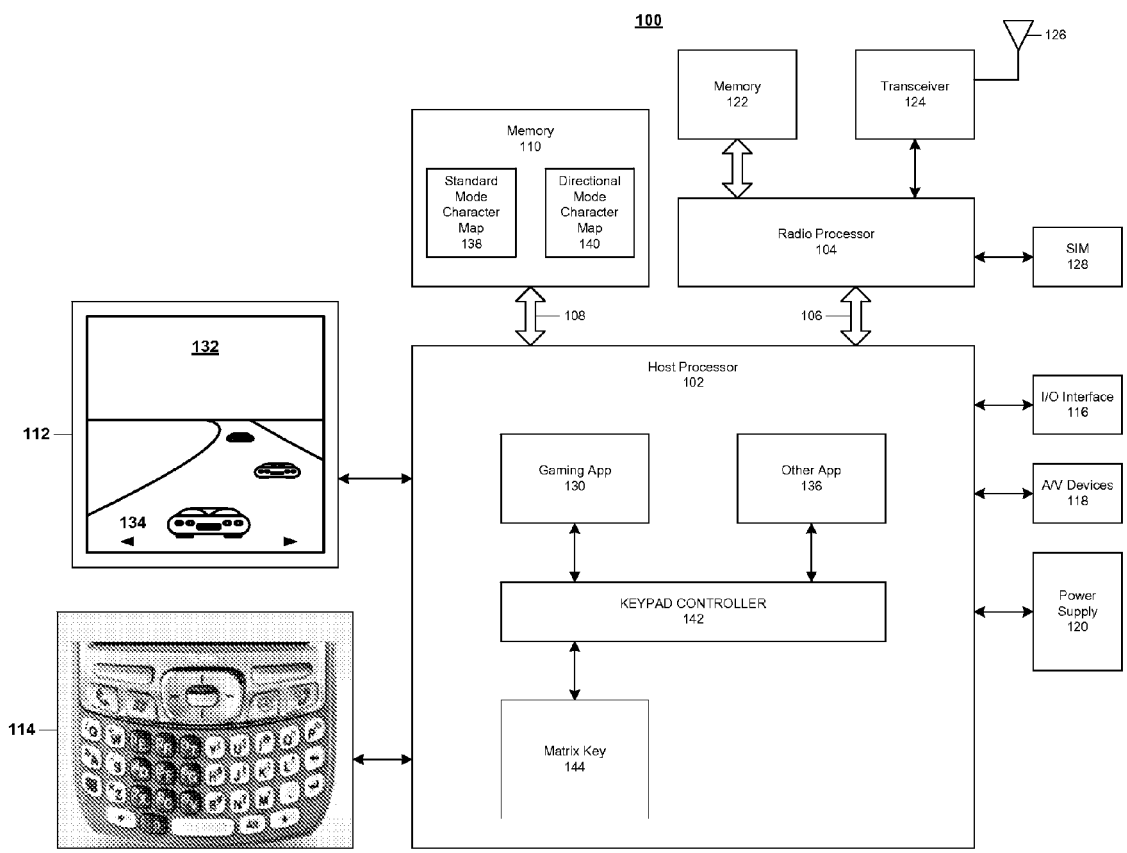
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v10, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise a display 112 coupled to the host processor 102. The display 112 may comprise any suitable visual interface for displaying content to a user of the mobile computing device 100. In one embodiment, for example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an alpha-numeric keypad 114 coupled to the host processor 102. The keypad 114 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.1 a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

In various embodiments, the mobile computing device 100 may comprise or implement one or more applications arranged to receive directional commands as input. As shown in FIG. 1, for example, the mobile computing device 100 may comprise a gaming application 130 arranged to receive directional commands as input when a user is playing a game. It is to be understood that the embodiments are not limited in this regard, and that the mobile computing device 100 may include any type of application arranged to receive direction commands as input which is consistent with the described embodiments.

The gaming application 130 may be implemented using any suitable programming language and may allow a user to play a single-player game, a multi-player game, an interactive game, a two-dimensional (2D) game, a three-dimensional (3D) game, and so forth. The gaming application 130 may be arranged to display a gaming user interface (UI) 132 on the display 112 when a user is playing a game. The gaming UI 132 may comprise a game object 134 (e.g., racing car) configured to move in multiple directions in response to directional commands input by the user. For example, the game object 134 may be configured to move left relative to the gaming UI 132 in response to receiving a left command as input and to move right relative to the gaming UI 132 in response to receiving a right command as input. The embodiments are not limited in this context.

As shown, the mobile computing device 100 also may comprise and/or implement one or more other applications 136 in addition to the gaming application 130. In general, the other applications 136 may comprise any type of client application that operates using the standard functions of the keypad 114. The other applications 136 may comprise, for example, one or more communications applications (e.g., telephone, voicemail, e-mail, IM, SMS, MMS), a web browser application, personal management applications (e.g., PIM, contacts, calendar, scheduling, tasks), word processing applications, spreadsheet applications, database applications, media applications (e.g., video player, audio player, multimedia player, digital camera, video camera, media management), location based services (LBS) applications, and so forth.

In general, the keypad 114 may be arranged to receive user input for the gaming application 130 and the other applications 136. In various embodiments, the keypad 114 may be arranged to operate in multiple modes including a standard mode and a directional mode such as a gaming mode, for example. In some implementations, the mobile computing device 100 may provide keypad settings that allow the user to control the functionality of the keypad 114 and change between modes. In some cases, the user may be presented with a keypad setting UI supported by the OS of the mobile computing device 100 and/or the gaming application 130, for example. The keypad setting UI may be configured to allow the user to change modes and/or to program certain keypad functions for each mode.

In some embodiments, when the keypad 114 is operating in the standard mode, the user may input a preset or programmed keystroke or keystroke combination to switch (or override) the keypad 114 into the directional mode. Such keystrokes may include, for example, double pressing a certain key or button and/or pressing and holding a certain key or button. Similarly, when operating in the directional mode, the keypad 114 may be switched to the standard mode in response to the user inputting a keystroke or keystroke combination. In some cases, the mobile computing device 100 may comprise a dedicated key, button, or switch configured to switch the operation of the keypad 114 between the standard mode and the directional mode. The embodiments are not limited in this context.

In general, the standard mode of the keypad 114 may support all of the preset and programmable commands and functions typically provided by the keypad 114 for normal operation of the mobile computing device 100. In the standard mode, keystrokes and keystroke combinations input to the keypad 114 may be interpreted as whatever preset and/or programmable content, commands, and functions are normally associated with such key strokes and keystroke combinations. Accordingly, the keypad 114 may be used in the standard mode to provide input to the gaming application 130 as well as the other applications 132.

In the standard mode, for example, pressing a letter key (e.g., [A] key) is interpreted as the corresponding lower case letter (e.g., "a"). Pressing a keystroke combination such as the [Shift] key or [Option] key followed by a letter key (e.g., [A] key) is interpreted as the corresponding capital letter (e.g., "A" if after the [Shift] key) or the corresponding symbol (e.g., "&" if after the [Option] key). Pressing a function button (e.g., phone/send button) will initiate the corresponding function (e.g., call dialed number), and pressing a navigation button will result in a corresponding directional command being sent to an application, for example.

By contrast, the directional mode may support limited functionality of the keypad 114 by associating certain directional commands (e.g., left and right commands) with many of the keys and/or buttons of the keypad 114. Accordingly, in the directional mode, most keystrokes and keystroke combinations input by the user will be interpreted as a particular directional command (e.g., left command or right command). While the functions of the keypad 114 may be substantially limited to generating directional commands, using the keypad 114 in the directional mode may be preferable to a user when running applications which respond primarily to directional commands, such as gaming application 130.

In some embodiments, the keypad 114 may support a native directional mode at the system level. It can be appreciated, however, that the embodiments are not limited in the regard and that the directional mode and keystroke interpretation may be supported at the application level. In some embodiments, for example, the directional mode may be activated programmatically by an application (e.g., gaming application 130) and may not require any key activation. In such embodiments, the interpretation of keystrokes and keystroke combinations may occur at the application level with any left keystroke or keystroke combination interpreted by the application as a left directional command and any right keystroke or keystroke combination interpreted by the application as a right directional command.

In the directional mode, the keypad 114 may comprise or implement multiple keypad regions each associated with a different directional command. In various embodiments, each keypad region may comprise several keys of the keypad 114 and may be associated with a particular directional command. Each key within a particular keypad region may be associated with the identical directional command. Accordingly, a user may press any key within a particular keypad region to generate the identical directional command.

In various embodiments, the keypad regions and associated directional commands may be programmable. For example, a keypad setting UI may be presented which allows the user to assign directional commands to certain keys and/or buttons for the directional mode. In some cases, the keypad setting UI may allow the user to select from among multiple predefined keypad region layouts.

In some implementations, keys of the keypad 114 which do not form part of any keypad region may function identically in both the directional mode and in the standard mode. For example, the navigation button may retain standard functionality in the directional mode and can be used to generate directional commands in addition to keys of the keypad regions. In some cases, keys of the keypad 114 which do not form part of any keypad region may be assigned or associated with functions consistent with the application employing the directional mode. For example, when running the gaming application 130 in the directional mode, certain keys which do not form part of any keypad region (e.g., space bar) may be assigned or associated with certain game actions (e.g., fire, jump, etc.).

In some embodiments, multiple alphanumeric numeric keys which are located on the left half of the keypad 114 may comprise a left keypad region, and each of the alphanumeric keys within the left keypad region may be associated with a left command. In addition, multiple alphanumeric numeric keys which are located on the right half of the keypad 114 may comprise a right keypad region, and each of the alphanumeric keys within the right keypad region may be associated with a right command. In such embodiments, pressing any alphanumeric key in the left keypad region of the keypad 114 will be interpreted as a left command when in the directional mode. Likewise, pressing any alphanumeric key in the right keypad region of the keypad 114 will be interpreted as a right command when in the directional mode.

In one embodiment, for example, the keypad 114 may comprise or implement a left keypad region comprising most of the keys located on the left half of the keypad 114 and a right keypad region comprising most of the keys located in the right half of the keypad 114. In such embodiment, the left keypad region may comprise the [W] key, [E] key, [R] key, [S] key, [D] key, [F] key, [Z] key, [X] key, and [C] key. Pressing any key in the left keypad region of the keypad 114 will be interpreted as a left command when in the directional mode. The right keypad region may comprise the [U] key, [I] key, [O] key, [J] key, [K] key, [L] key, [N] key, [M] key, and [.] key. Pressing any key in the right keypad region of the keypad 114 will be interpreted as a right command when in the directional mode. It can be appreciate that in some embodiments, the keys of the left keypad region are capable of being pressed by the left thumb of a user, and the keys of the right keypad region are capable of being pressed by the right thumb of the user.

It is to be understood that the embodiments are not limited to comprising only a left keypad region and a right keypad region. For example, in some embodiments, additional directional commands and keypad regions may be implemented and/or each keypad region may comprise a greater or lesser number of keys depending on the particular implementation.

As shown in FIG. 1, the mobile computing device 100 may comprise or implement a standard character map 138. The standard character map 138 may comprise a lookup table stored in memory 110, for example, that defines the content, commands, and functions which correspond to each keystroke or combination of keystrokes when the keypad 114 is operating in the standard mode. The mobile computing device 100 also may comprise or implement a directional character map 140 (e.g., gaming character map). The directional character map 140 may comprise a lookup table stored in memory 110, for example, that defines the content, commands, and functions which correspond to each keystroke or combination of keystrokes when the keypad 114 is operating in the directional mode. In various implementations, the directional character map 140 may be used instead of the standard character map 138 when a user is playing a game.

The mobile computing device 100 may comprise a keypad controller 142. The keypad controller 142 may comprise, for example, hardware and/or software such as keypad control logic (e.g., instructions, data, and/or code) to be executed by a logic device (e.g., host processor 102). The keypad control logic may be stored internally or externally to the logic device on one or more types of computer-readable storage media.

In various implementations, the keypad controller 142 may be arranged to reference either the standard character map 138 and/or the directional character map 140 in order to translate each keystroke or combination of keystrokes input by the user into the corresponding content, command, or function. For example, the keypad controller 142 may reference the standard character map 138 when the keypad 114 is operating in the standard mode and may reference the directional character map 140 when the keypad 114 is operating in the directional mode.

In the standard mode, for example, the keypad controller 142 may be arranged to compare a keystroke or keystroke combination to the standard character map 138 and to generate keypad data representing the corresponding content, command, or function. The keypad controller 142 may forward the keypad data to the appropriate application. It can be appreciated that in the standard mode, appropriate applications include the gaming application 130 as well as the other applications 136. In some cases, the keypad data may be passed through the OS of the mobile computing device 100 to check whether the keyboard data represents a system level command. Upon receiving the keypad data from the keypad controller 142, the application may determine whether the keypad data represents content, a command, or a function, and then may act accordingly to display content, execute a command, or perform a function. The application may be arranged to ignore keypad data representing content, commands, or functions which are inconsistent with the application.

In the directional mode, for example, the keypad controller 142 may be arranged to compare a keystroke or keystroke combination to the directional character map 140 and to generate keypad data representing the corresponding content, command, or function. In most cases, the keypad data generated by the keypad controller 142 may represent a directional command (e.g., left command or right command). In general, by referencing the directional character map 140, the keypad controller 142 may interpret most keystrokes or keystroke combinations as a particular directional command.

The keypad controller 142 may forward the keypad data representing the directional command to an application (e.g., gaming application 130) arranged to receive directional commands as input. For example, upon receiving the keypad data from the keypad controller 142, the gaming application 130 may determine that the keypad data represents a directional command, such as a left command, and then may act accordingly, such as by executing a left command to move the game object 134 to the left relative to the gaming UI 132. While not always the case, it can be appreciated that in some implementations the other applications 136 may be prevented from using directional mode.

As shown, the mobile computing device 100 may comprise a matrix key 144. In various embodiments, the key pad controller 142 may be arranged to receive keystrokes and keystroke combinations from the matrix key 144. The matrix key 144 may comprise, for example, hardware and/or software such as keystroke determination logic (e.g., instructions, data, and/or code) to be executed by a logic device (e.g., host processor 102). The keystroke determination logic may be stored internally or externally to the logic device on one or more types of computer-readable storage media.

The matrix key 144 may be arranged to determine keystrokes and keystroke combinations based on electrical signals received from the keypad 114. In various embodiments, the matrix key 144 may interpret a flow of electrical current and/or a change in the flow of electrical current as a keystroke or keystroke combination. For example, the matrix key 144 may be arranged to detect a change in current flow and interpret such change as a particular keystroke.

The keypad 114 may comprise a grid or matrix of circuits and switches responsive to user input keystrokes. The keypad 114 may employ a variety of switch technologies including mechanical (e.g. metal contact, carbon contact, membrane, etc.) and non-mechanical (e.g., capacitive) switches. When a key is pressed on the keypad 114, for example, the pressure may close a switch to complete a circuit and allow the flow of current and/or cause a change in current flow. The matrix key 144 may be arranged to interpret such current flow or change in current flow as one or more keystrokes, which may be provided to the keypad controller 142.

In various embodiments, when the keypad 114 is operating in the directional mode, the matrix key 144 may be arranged to recognize the pressing and holding of a particular key as a repeated keystroke and to recognize the double pressing of a particular key as two separate keystrokes. The matrix key 144 also may be arranged to recognize the simultaneous pressing or substantially simultaneous (e.g., within a certain delay parameter) pressing of multiple keys within a particular keypad region as a single keystroke so that a single press to a keypad region results in the generation of a single directional command.

Figure 2:
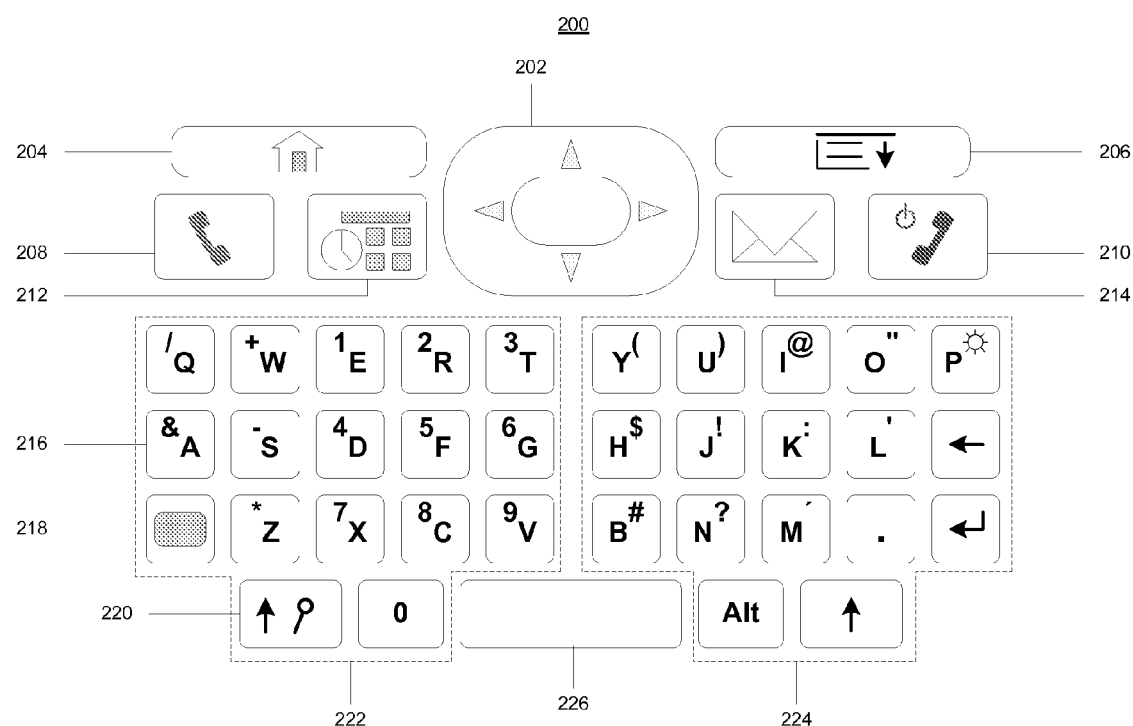
FIG. 2 illustrates a keypad for a mobile computing device in accordance with one or more embodiments.

FIG. 2 illustrates a keypad 200 in accordance with one or more embodiments which may be implemented by the mobile computing device 100 of FIG. 1. As shown, the keypad 200 may comprise alphanumeric keys having a QWERTY key layout and an integrated number dial pad. Although a QWERTY key layout is shown for purposes of illustration, it can be appreciated that the keypad 200 may comprise any other suitable key layout such as a Dvorak key layout (e.g., vowels on the left side and common consonants on the right side), an ABCDE key layout, an XPeRT key layout, a QWERTZ key layout, an AZERTY key layout, and so forth. The keypad 200 may comprise various configurations of typing keys, numeric keys, alphanumeric keys, symbol keys, function keys, and control keys depending on the manufacturer, the OS, and/or applications.

In this embodiment, the keypad 200 comprises various buttons such as a navigation button 202, a left action button 204 (e.g., [Home] button), a right action button 206 (e.g., [Menu] button), a phone/send button 208, a power/end button 210, a calendar button 212, and a messaging button 214. As shown, the keypad 200 also comprises various alphanumeric and control keys including an [A] key 216, and [Option] key 218, and a [Shift] key 220.

In various embodiments, the keypad 200 may be arranged to operate in multiple modes including a standard mode and a directional mode such as a gaming mode, for example. The standard mode of the keypad 200 may support all of the preset and programmable commands and functions typically provided for normal operation. In the standard mode, keystrokes and keystroke combinations input to the keypad 200 are interpreted as whatever preset and/or programmable content, commands, and functions are normally associated with such key strokes and keystroke combinations. In the standard mode, for example, pressing the [A] key 216 is interpreted as "a"; pressing the [Shift] key 220 then the [A] key 216 is interpreted as "A"; pressing the [Option] key 218 then the [A] key 216 is interpreted as "&".

The directional mode may support limited functionality of the keypad 200 by associating certain directional commands (e.g., left and right commands) with many of the keys and/or buttons of the keypad 200. Accordingly, in the directional mode, most keystrokes and keystroke combinations input by the user will be interpreted as a particular directional command (e.g., left command or right command). While the functions of the keypad 200 may be substantially limited to generating directional commands, using the keypad 200 in the directional mode may be preferable to a user when running applications which respond primarily to directional commands.

In the directional mode, the keypad 200 may comprise or implement multiple keypad regions each associated with a different directional command. As shown, the keypad 200 may comprise or implement a left keypad region 222 comprising multiple keys located on the left half of the keypad 200 and a right keypad region 224 comprising multiple keys located in the right half of the keypad 200. Each of the keys within the left keypad region 222 may be associated with a left command. Each of the keys within the right keypad region 224 may be associated with a right command. In such embodiments, pressing any key in the left keypad region 222 of the keypad 200 will be interpreted as a left command when in the directional mode. Likewise, pressing any key in the right keypad region 224 of the keypad 200 will be interpreted as a right command when in the directional mode. It can be appreciate that in some embodiments, the keys of the left keypad region 222 are capable of being pressed by the left thumb of a user, and the keys of the right keypad region 224 are capable of being pressed by the right thumb of the user.

It is to be understood that the embodiments are not limited to comprising only the left keypad region 222 and the right keypad 224. For example, in some embodiments, additional directional commands and keypad regions may be implemented and/or each keypad region may comprise a greater or lesser number of keys depending on the particular implementation.

In some embodiments, a "joystick" mode of mapping the keypad 200 may be supported in which keypad regions closer to the periphery of the keypad 200 exhibit more functionality, and keypad regions closer to the center of the keypad 200 exhibit less or neutral functionality. In one embodiment, for example, when running a driving game, the keys of the far left two columns (e.g. [Q] key, [A] key, [Option] key, [W] key, [S] key, and [Z] key) may be interpreted as a "hard left" directional command. The keys of the inner left two columns (e.g., [E] key, [D] key, [X] key, [R] key, [F] key, and [C] key) may be interpreted as a "mild left" directional command. The keys of the two central columns (e.g., [T] key, [G] key, [V] key, [Y] key, [H] key and [B] key) all may return steering to a center or straight position. The keys of the inner right two columns (e.g., [U] key, [J] key, [N] key, [I] key, [K] key, and [M] key) may be interpreted as a "mild right" directional command. The keys of the far right two columns (e.g., [O] key, [L] key, [.] key, [P] key, [Backspace] key, and [Enter] key) may be interpreted as a "hard right" directional command.

In an embodiment for a flying game, for example, the keys of the top row may be interpreted as a "down" directional command, and the keys of the bottom row may be interpreted as an "up" directional command. In such an embodiment, the [Q] key and [W] keys may be interpreted as a "hard left and down" directional command while the [N] key and [M] key may be interpreted as a "mild right and up" directional command.

In some implementations, keys of the keypad 200 which do not form part of either the left keypad region 222 or the right keypad region 224 may function identically in both the directional mode and in the standard mode. For example, the navigation button 202 may retain standard functionality in the directional mode and can be used to generate directional commands in addition to keys of the left keypad region 222 and the right keypad region 224. In some embodiments, the left action button 204, right action button 206, phone/send button 208, power/end button 210, calendar button 212, and messaging button 214 may retain standard functionality.

In some cases, keys of the keypad 200 which do not form part of either the left keypad region 222 or the right keypad region 224 may be assigned or associated with functions consistent with the application employing the directional mode. For example, one or more of the left action button 204, right action button 206, phone/send button 208, power/end button 210, calendar button 212, messaging button 214, and space bar 226 may be assigned or associated with certain actions performed by the application employing the directional mode.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIG. 1. The embodiments are not limited in this context.

The logic flow 300 may comprise determining user input keystrokes and keystroke combinations to a keypad region of a keypad (block 302). In various embodiments, the keypad (e.g., keypad 114) may be arranged to operate in multiple modes including a standard mode and a directional mode such as a gaming mode, for example. The standard mode may support all of the preset and programmable commands and functions typically provided for normal operation. In the standard mode, input keystrokes and keystroke combinations are interpreted as whatever preset and/or programmable content, commands, and functions are normally associated with such key strokes and keystroke combinations.

The directional mode may associate certain directional commands (e.g., left and right commands) with many of the keys and/or buttons of the keypad so that most keystrokes and keystroke combinations input by the user will be interpreted as a particular directional command (e.g., left command or right command). The directional mode may be used when running applications which respond primarily to directional commands (e.g., gaming application 130).

For example, in the directional mode, the keypad 114 may comprise or implement multiple keypad regions each associated with a different directional command. Each keypad region may comprise several keys of the keypad 114 and may be associated with a particular directional command. Each key within a particular keypad region may be associated with the identical directional command. Accordingly, a user may press any key within a particular keypad region to generate the identical directional command. In various embodiments, the keypad regions and associated directional commands may be programmable. In some implementations, keys of the keypad 114 which do not form part of any keypad region may function identically in both the directional mode and in the standard mode. In some cases, keys of the keypad 114 which do not form part of any keypad region may be assigned or associated with functions consistent with the application employing the directional mode.

In one embodiment, for example, the keypad 114 may comprise or implement a left keypad region comprising most of the keys located on the left half of the keypad 114 and a right keypad region comprising most of the keys located in the right half of the keypad 114. Pressing any key in the left keypad region of the keypad 114 will be interpreted as a left command when in the directional mode. Pressing any key in the right keypad region of the keypad 114 will be interpreted as a right command when in the directional mode. The keys of the left keypad region may be arranged to be pressed by the left thumb of a user, and the keys of the right keypad region may be arranged to be pressed by the right thumb of the user.

It is to be understood that the embodiments are not limited to comprising only a left keypad region and a right keypad region. In some embodiments, for example, a "joystick" mode of mapping the keypad 114 may be supported in which keypad regions closer to the periphery of the keypad 114 exhibit more functionality, and keypad regions closer to the center of the keypad 114 exhibit less or neutral functionality.

The logic flow 300 may comprise interpreting the keystrokes and keystroke combinations to the keypad region as a directional command (block 304). In the directional mode, for example, the keypad controller 142 may be arranged to compare a keystroke or keystroke combination to the directional character map 140. The directional character map 140 may comprise a lookup table that defines the content, commands, and functions which correspond to each keystroke or combination of keystrokes when the keypad 114 is operating in the directional mode. In various implementations, the directional character map 140 may be used instead of the standard character map 138 when a user is playing a game. In general, by referencing the directional character map 140, the keypad controller 142 may interpret most keystrokes or keystroke combinations as a particular directional command.

The logic flow 300 may comprise generating keypad data representing the directional command (block 306). In the directional mode, for example, the keypad controller 142 may be arranged to generate keypad data representing a directional command (e.g., left command or right command).

The logic flow 300 may comprise forwarding the keypad data to an application arranged to receive directional commands as input (block 308). In various embodiments, the keypad controller 142 may forward the keypad data representing the directional command to an application (e.g., gaming application 130) arranged to receive directional commands as input. Upon receiving the keypad data from the keypad controller 142, the gaming application 130 may determine that the keypad data represents a directional command, such as a left command, and then may act accordingly, such as by executing a left command to move the game object 134 to the left relative to the gaming UI 132. While not always the case, it can be appreciated that in some implementations the other applications 136 may be prevented from using directional mode.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device comprising:
   a mobile computing device keypad comprising multiple keypad regions, each keypad region comprising multiple adjacent keys and associated with a particular directional command; and
   a keypad controller operative to generate keypad data representing directional commands, wherein pressing any key within a particular keypad region causes the keypad controller to generate an identical directional command.

2. The apparatus of claim 1, wherein the multiple keypad regions comprise a left keypad region associated with a left directional command and a right keypad region associated with a right directional command.

3. The apparatus of claim 1, wherein keypad regions closer to a periphery of the keypad exhibit more functionality, and keypad regions closer to a center of the keypad exhibit less or neutral functionality.

4. The apparatus of claim 1, wherein the keypad regions are programmable.

5. The apparatus of claim 1, further comprising an application to receive directional commands as input.

6. The apparatus of claim 5, the application comprising a gaming application.

7. The apparatus of claim 1, the keypad to operate in multiple modes including a standard mode and a directional mode.

8. The apparatus of claim 7, wherein the directional mode comprises a gaming mode.

9. The apparatus of claim 7, further comprising a directional character map defining directional commands corresponding to each keystroke and keystroke combination for the directional mode.

10. The apparatus of claim 1, further comprising a matrix key to determine user input keystrokes and keystroke combinations.

11. A method to associate directional commands to a keypad region of a mobile computing device, comprising:
    determining user input keystrokes and keystroke combinations to a keypad region of a keypad of the mobile computing device, the keypad comprising multiple keypad regions, each keypad region comprising multiple adjacent keys and associated with a particular directional command; and
    interpreting the keystrokes and keystroke combinations to the keypad region as a directional command.

12. The method of claim 11, wherein the multiple keypad regions comprise a left keypad region associated with a left directional command and a right keypad region associated with a right directional command.

13. The method of claim 11, wherein keypad regions closer to a periphery of the keypad exhibit more functionality, and keypad regions closer to a center of the keypad exhibit less or neutral functionality.

14. The method of claim 11, further comprising generating keypad data representing the directional command.

15. The method of claim 11, further comprising forwarding the keypad data to an application arranged to receive directional commands as input.

16. The method of claim 15, the application comprising a gaming application.

17. A computer-readable storage medium comprising instructions that if executed enable a mobile computing device to:
    determine user input keystrokes and keystroke combinations to a keypad region of a keypad of the mobile computing device, the keypad comprising multiple keypad regions, each keypad region comprising multiple adjacent keys and associated with a particular directional command; and
    interpret the keystrokes and keystroke combinations to the keypad region as a directional command.

18. The storage medium of claim 17, wherein the multiple keypad regions comprise a left keypad region associated with a left directional command and a right keypad region associated with a right directional command.

19. The storage medium of claim 17, wherein keypad regions closer to a periphery of the keypad exhibit more functionality, and keypad regions closer to a center of the keypad exhibit less or neutral functionality.

20. The storage medium of claim 17, further comprising instructions that if executed enable a computing system to generate keypad data representing the directional command.

21. The storage medium of claim 17, further comprising instructions that if executed enable a computing system to forward the keypad data to an application arranged to receive directional commands as input.

22. The storage medium of claim 21, the application comprising a gaming application.

* * * * *

UNITED STATES PATENT AND TRADEMARK OFFICE
CERTIFICATE OF CORRECTION

PATENT NO. : 7,599,712 B2
APPLICATION NO. : 11/535683
DATED : October 6, 2009
INVENTOR(S) : Pieter S. van der Meulen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Twenty-eighth Day of September, 2010

David J. Kappos
*Director of the United States Patent and Trademark Office*